(12) United States Patent
Robertson

(10) Patent No.: US 10,600,519 B2
(45) Date of Patent: Mar. 24, 2020

(54) NUCLEAR REACTOR MODULE

(71) Applicant: ROLLS-ROYCE PLC, London (GB)

(72) Inventor: Daniel Robertson, Derby (GB)

(73) Assignee: ROLLS-ROYCE plc, London (GB)

( * ) Notice: Subject to any disclaimer, the term of this patent is extended or adjusted under 35 U.S.C. 154(b) by 1216 days.

(21) Appl. No.: 14/636,915

(22) Filed: Mar. 3, 2015

(65) Prior Publication Data

US 2015/0243380 A1 Aug. 27, 2015

Related U.S. Application Data

(62) Division of application No. 13/399,211, filed on Feb. 17, 2012, now abandoned.

(30) Foreign Application Priority Data

Mar. 18, 2011 (GB) .................................. 1104548.1

(51) Int. Cl.
*B28B 7/00* (2006.01)
*G21D 1/00* (2006.01)
*G21C 13/024* (2006.01)

(52) U.S. Cl.
CPC .......... *G21C 13/024* (2013.01); *B28B 7/0008* (2013.01); *G21D 1/00* (2013.01); *Y02E 30/40* (2013.01)

(58) Field of Classification Search
CPC .................................................... B28B 7/0008
See application file for complete search history.

(56) References Cited

U.S. PATENT DOCUMENTS

| 2,816,346 A | 12/1957 | Martin |
| 3,397,503 A * | 8/1968 | Adler ........................ E04H 7/20 |
| | | 220/565 |
| 3,801,444 A | 4/1974 | Kraemer |

(Continued)

FOREIGN PATENT DOCUMENTS

| JP | H2-47588 A | 2/1990 |
| JP | H4-293864 A * | 10/1992 |
| JP | H3027430 B2 | 4/2000 |

OTHER PUBLICATIONS

Oct. 6, 2014 Search Report issued in European Application No. 12 15 5884.

(Continued)

*Primary Examiner* — Matthew J Daniels
*Assistant Examiner* — Patrick Butler
(74) *Attorney, Agent, or Firm* — Oliff PLC

(57) ABSTRACT

A method of constructing a nuclear reactor module includes providing formwork defining a chamber in which is mounted a nuclear reactor comprising a nuclear reactor pressure vessel configured to contain nuclear fuel when in use, the formwork being housed within a containment structure configured to contain an internal pressure generated by an escape of coolant from a reactor coolant circuit. The method further includes filling one or more voids within the formwork with concrete through at least one concrete supply pipe that extends from outside of the containment structure, through the containment structure, and to the formwork; and venting the one or more voids within the formwork through one or more vent pipes, thereby forming a concrete support structure for the nuclear reactor.

5 Claims, 3 Drawing Sheets

(56) References Cited

U.S. PATENT DOCUMENTS

Figure 1:
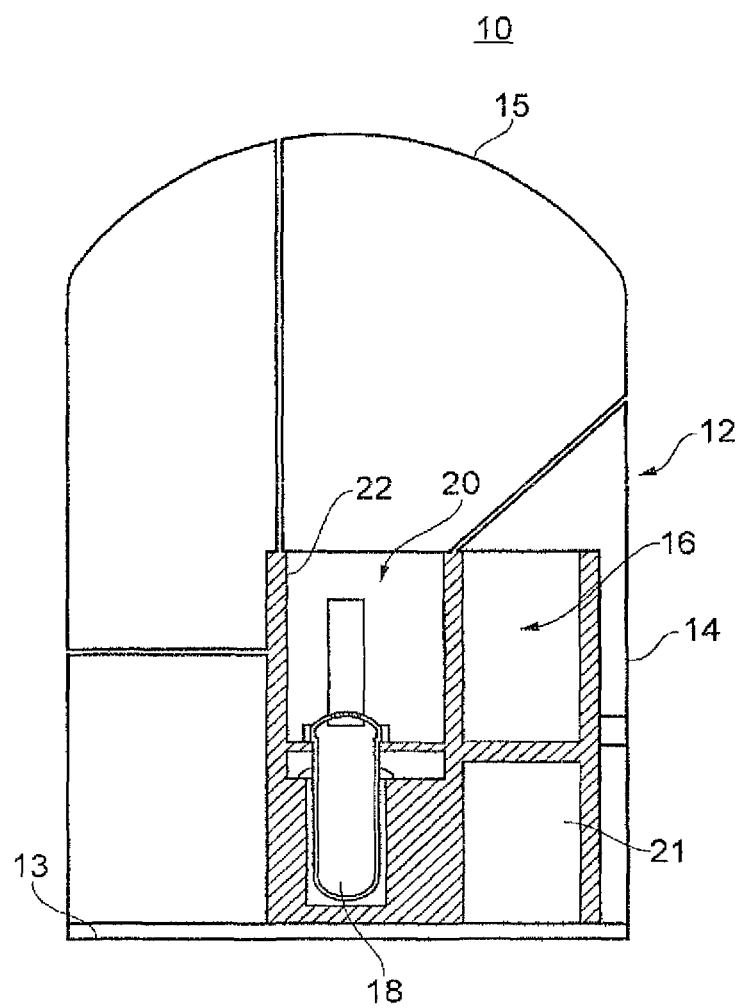

| | | | |
|---|---|---|---|
| 4,055,927 | A | 11/1977 | Tamara |
| 4,129,008 | A | 12/1978 | Nakahara et al. |
| 4,508,677 | A | 4/1985 | Craig et al. |
| 4,643,872 | A | 2/1987 | Schoening et al. |
| 4,817,353 | A | 4/1989 | Woods et al. |
| 5,610,962 | A | 3/1997 | Solorzano et al. |
| 6,745,528 | B2 | 6/2004 | Morita et al. |
| 2005/0213698 | A1* | 9/2005 | Morishige ............... G21F 5/005 376/272 |
| 2010/0300013 | A1 | 12/2010 | Imaoka et al. |

OTHER PUBLICATIONS

Jun. 29, 2011 Search Report issued in British Application No. GB1104548.1.

\* cited by examiner

NUCLEAR REACTOR MODULE

This is a continuation of U.S. application Ser. No. 13/399,211 filed Feb. 17, 2012, which claims priority to GB 1104548.1 filed Mar. 18, 2011. The prior applications, including the specification, drawings and abstracts are incorporated herein by reference in their entirety.

The invention relates to a part-built nuclear reactor module and a method for constructing a nuclear reactor module. In particular, although not exclusively, the invention relates to a transportable part-built nuclear reactor module.

Nuclear reactor systems are known which comprise nuclear reactor equipment including a nuclear reactor vessel and a reactor coolant circuit for circulating coolant through the reactor vessel. The nuclear reactor equipment is typically supported by a reinforced concrete support structure which is housed within a containment structure.

Such nuclear reactor systems are typically constructed on site. For example, the containment structure may be assembled by either welding together sections of steel plate or by assembling formwork on site into which concrete is poured. Formwork may then be assembled within the containment structure into which concrete is poured to form the concrete support structure for supporting the nuclear reactor equipment. After the concrete support structure has been cleaned and finished the nuclear reactor equipment can be attached and tested.

Whilst this is satisfactory, in some circumstances it may be desirable to construct and test at least part of the nuclear reactor system in a factory off-site and then subsequently transport it to site. However, this can be difficult due to the weight of the containment structure housing the concrete support structure and the nuclear reactor equipment.

In a broad aspect of the invention there is provided formwork supporting nuclear reactor equipment that can be filled with concrete from the outside of a containment structure through a concrete supply pipe. The formwork may be housed within a containment structure and the supply pipe may extend from the formwork to the outside of the containment structure. This arrangement allows a part-built module to be manufactured off-site in a factory where it can be tested, and subsequently transported by vehicle to site for installation and completion involving concrete pouring.

According to an aspect of the invention there is provided a part-built nuclear reactor module, comprising a containment structure housing therein nuclear reactor equipment mounted to formwork; and at least one concrete supply pipe extending from outside of the containment structure to the formwork; wherein the formwork can be filled with concrete through the concrete supply pipe to form a concrete support structure for the nuclear reactor equipment. The formwork may be filled under pressure and may be filled from the bottom.

The nuclear reactor equipment may comprise a nuclear reactor vessel and/or a steam generator and/or a pressuriser and/or an accumulator and/or monitoring sensors and/or control circuitry and/or at least part of a coolant circuit.

At least part of the formwork is permanent. The formwork may comprise reinforcement bars and/or reinforcement plates. The formwork may define a plurality of voids, each arranged to be filled with concrete through a concrete supply pipe. Each void may be provided with a separate concrete supply pipe. Each concrete supply pipe may extend towards the bottom of the respective void. The formwork may be made from metal such as steel, for example.

The module may further comprise at least one removable support that temporarily supports at least some of the nuclear reactor equipment during transportation. The removable support may be a cable, and/or additional framework. The module may further comprise at least one removable brace that temporarily supports at least some of the formwork during transportation.

The containment structure may comprise a roof which is supported by at least one concrete supply pipe or vent pipe at least during transportation.

There may be provided at least one vent pipe extending from the formwork to the outside of the containment structure for venting dust and/or gases to the atmosphere.

The or each concrete supply pipe and the or each vent pipe may be detachable from the module such that after the formwork has been filled with concrete the or each supply pipe can be removed. The pipes may be supplied with drybreak connectors that connect the pipes to the formwork in order to prevent gases and dust escaping from the pipes into the containment structure when the pipes are disconnected.

The formwork may comprise at least one void having a structural void and an expansion void disposed above the structural void with a structural support plate having at least one hole therein disposed therebetween. The void may be arranged to be filled with concrete above the structural support plate such that the structural void is filled with structural concrete which can support a load applied to the structural support plate. At least one vent pipe may extend from the expansion void to outside of the containment structure for venting dust and/or gases to the atmosphere.

The containment structure may be steel or may be formwork arranged to be filled with concrete on site.

The part-built nuclear reactor module may be transportable by vehicle, for example.

The invention also concerns a nuclear reactor module constructed from a part-built nuclear reactor module in accordance with claim 1. The nuclear reactor module may be part of a water cooled nuclear reactor installation.

According to a further aspect of the invention there is provided a method of constructing a nuclear reactor module, comprising: filling formwork which has nuclear reactor equipment mounted thereto and which is housed within a containment structure with concrete through a concrete supply pipe which extends from outside of the containment structure to the formwork, thereby forming a concrete support structure for the nuclear reactor equipment.

The method may further comprise removing at least one removable support that temporarily supports at least some of the nuclear reactor equipment during transportation. The method may further comprise removing at least one removable brace that temporarily supports at least some of the formwork during transportation.

The method may further comprise detaching the or each concrete supply pipe after the formwork has been filled with concrete and removing the or each concrete supply pipe from the containment structure.

The formwork may comprise at least one void having a structural void and an expansion void disposed above the structural void with a structural support plate having at least one hole therein disposed therebetween. The method may further comprise filling the void with concrete to a level above the structural support plate such that the structural void is filled with structural concrete which can support a load applied to the structural support plate.

The invention may comprise any combination of the features and/or limitations referred to herein, except combinations of such features as are mutually exclusive.

Figure 2:
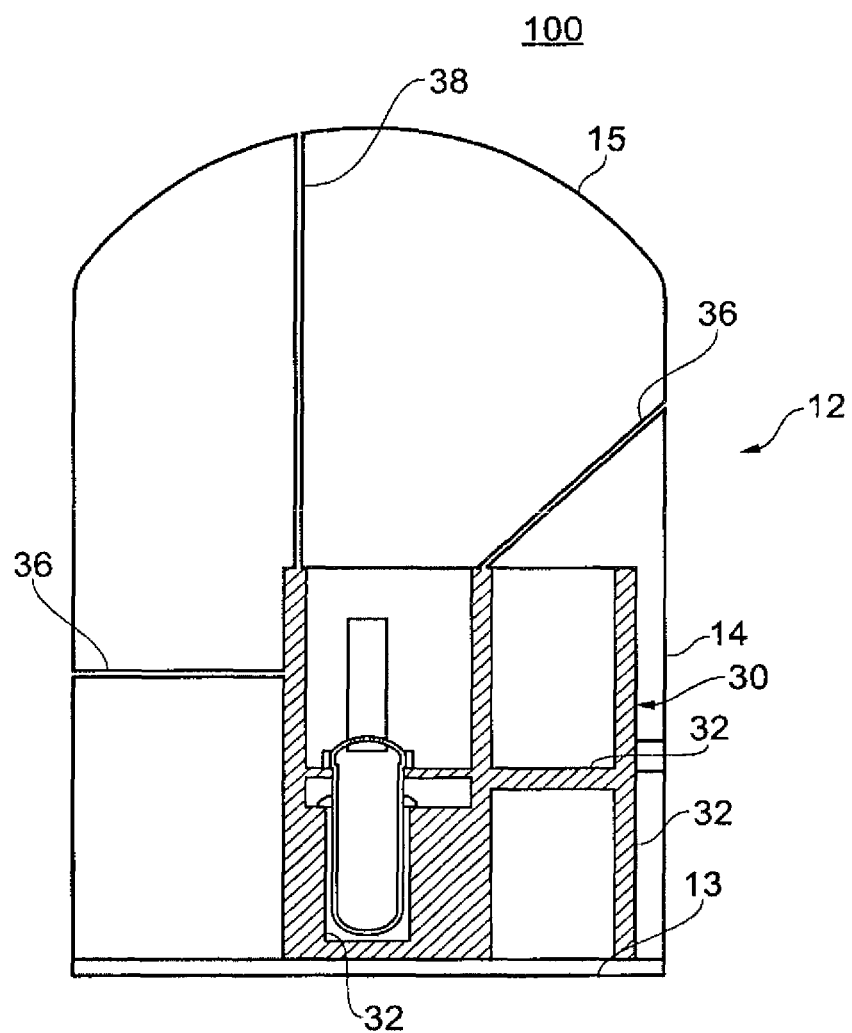
Figure 3:
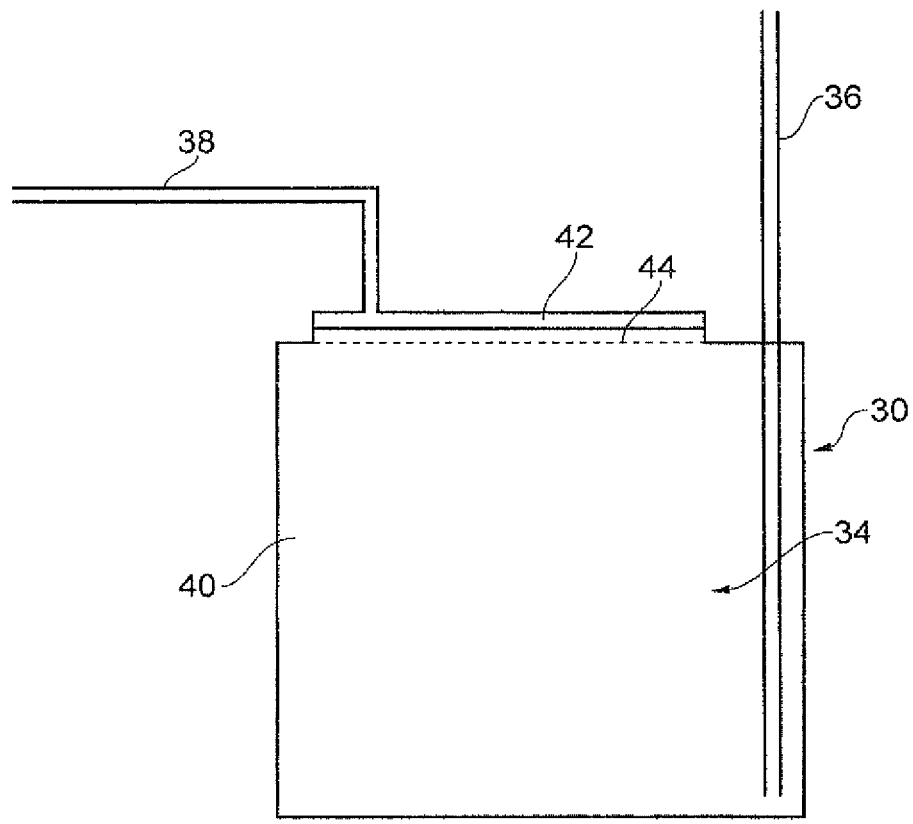

Embodiments of the invention will now be described, by way of example only, with reference to the accompanying drawings, in which:

FIG. 1 schematically shows a cross-sectional view through a nuclear reactor installation;

FIG. 2 schematically shows a cross-sectional view through a part-built nuclear reactor module; and FIG. 3 schematically shows a formwork void filled with concrete through a concrete supply pipe.

FIG. 1 shows a nuclear reactor installation which in this embodiment is a nuclear reactor module 10. The reactor module 10 comprises a containment structure 12 which is in the form of a building having a base 13, a generally cylindrical outer wall 14, and a domed-roof 15. In this particular embodiment the containment structure is made from steel plate welded together. However, in other embodiments the containment structure may be formwork for forming a reinforced concrete containment structure, for example.

A reinforced concrete support structure 16 is housed within the containment structure 12 and supports nuclear reactor equipment. The nuclear reactor equipment supported by the concrete structure 16 includes a nuclear reactor pressure vessel 18, a steam generator, a pressuriser, an accumulator, monitoring sensors and control circuitry. At least part of a coolant circuit for circulating coolant through the reactor vessel 18 is also provided within the concrete structure. The containment structure 12 is arranged to contain a high internal pressure generated by an escape of coolant from the reactor coolant circuit. In this particular embodiment the coolant is water.

The reinforced concrete structure 16 also comprises a refuelling cavity wall 20 which defines a refuelling cavity 22 which is filled with water during refuelling of the reactor vessel 18. The concrete structure 16 also forms numerous tanks, or cavities, within the interior of the structure including a spent fuel pool 21. The concrete also provides radiation shielding from the radiation emitted from the nuclear fuel.

Referring now to FIG. 2, the nuclear reactor module 10 is constructed on site from a part-built nuclear reactor module 100 that is manufactured and tested in a factory and transported to site. The part-built nuclear module comprises the containment structure 12 having a base 13, an outer cylindrical wall 14, and a domed roof 15, within which concrete formwork 30 is housed. The nuclear reactor equipment including the nuclear reactor pressure vessel 18, the steam generator, the pressuriser, the accumulator, monitoring sensors and control circuitry is mounted to the formwork 30. At least part of a coolant circuit for circulating coolant through the reactor vessel 18 is also mounted to the formwork 30.

The formwork 30 comprises a plurality of steel plates 32 that are welded or otherwise attached together to form a plurality of voids 34 that are arranged to be filled with concrete. The voids 34 may be in fluid communication with one another through passageways so that liquid concrete can flow between them or they may be discrete. Structural reinforcement in the form of reinforcement bars and reinforcement plates (not shown) are disposed within the voids 34 and form part of the formwork 30.

A plurality of concrete supply conduits 36, or pipes, extend from outside of the containment structure to the formwork 30. Each concrete supply pipe 36 is in fluid communication with at least one void 34 and each void 34 may be provided with a separate concrete supply pipe 36. In some embodiments the or each concrete supply pipe 36 extends to the bottom of the respective void 34.

A vent pipe 38 is also provided that extends from the formwork 30 to the outside of the containment structure. The vent pipe 38 allows dust and gas that can be generated during the concrete filling process to be vented to the atmosphere. It will be appreciated that a plurality of vent pipes 38 may be provided if needed.

After the part-built nuclear reactor module 100 has been assembled in a factory the nuclear reactor equipment can be tested. This ensures that the equipment is working correctly before it is transported and installed on site. After testing is complete the part-built nuclear reactor module 100 is transported to site by vehicle for installation. The formwork 30 provides sufficient structural support to the nuclear reactor equipment during transportation. If necessary, additional frameworks, cables, or supports may be provided to further support the nuclear reactor equipment during transportation. These additional supports may be removed once the part-built module 100 has been transported to site. The formwork 30 is also constructed so that it can support itself during transportation. However, if necessary internal bracing or other supports may be provided to support the formwork 30, such as the voids 34. This bracing can be removed after the part-built module 100 has been transported to site.

The concrete supply pipes 36 and the vent pipe 38 provide structural support to the containment structure 12 during transportation. In particular, in this embodiment, the vent pipe 38 provides structural support to the domed roof 15 during transportation. This reduces the unsupported length of roof and means that the roof stiffness can be reduced. It should be appreciated that it is not essential that the pipes provide structural support to the containment structure 12 during transport.

On site, the part-built module 100 is lifted and set into position by heavy-lifting equipment. The formwork 30 is then filled with concrete from the outside of the containment structure through the plurality of concrete supply pipes 36. The formwork 30 is filled with concrete through the pipes 36 under pressure and from the bottom of the voids 34. This helps to prevent the formation of gaps (or voids) within the concrete. Concrete delivery pipes from a concrete mixer vehicle (not shown) can be attached to the outer end of the concrete supply pipes 36 from the outside of the containment structure to deliver concrete to the formwork 30. The concrete is then left to set for the required period of time after which the concrete support structure 16 is complete. Dust and gas generated during the concrete pouring process is vented to the atmosphere through the vent pipe 38. This prevents the build-up of dust and gas within the clean interior of the containment structure 12. The concrete support structure 16 may then be inspected visually or by x-ray techniques, for example.

Although in this embodiment the containment structure 12 is steel, the containment structure 12 may be made from any other suitable material. In one embodiment the containment structure 12 of the part-built module 100 may be formwork that is arranged to be filled with concrete on site. In such an embodiment the concrete supply pipes 36 of the part-built module 100 may extend from outside of the formwork of the containment structure 12 to the formwork 30 housed therein. During transit the supply pipes 36 may support the containment structure 12 formwork. On site, the formwork 30 can be filled with concrete through the concrete supply pipes 36 which then support the containment structure 12 formwork as it is filled with concrete.

The concrete supply pipes 36 and/or the vent pipes 38 may be detachable from the part-built module 100. This would allow the pipes 36, 38 to be detached from the formwork 30 and the containment structure 12 after the formwork 30 has been filled with concrete. The pipes 36, 38 could be removed through an access opening in the containment structure 12 or could be removed from the outside of the containment structure 12 through the opening through which it extends. The pipes 36, 38 may include an end cap for closing the opening in the containment structure 12. The ends of the pipes 36, 38 connected to the formwork 30 may be coupled to the formwork 30 using drybreak connectors. This would prevent the leakage of concrete dust or particles into the interior of the containment structure 12 as the pipes 36, 38 are disconnected.

The completed concrete support structure 16 formed from filing the formwork 30 with concrete provides the necessary walls 22 and cavities 20, 21 and provides the structural support to the nuclear reactor equipment such as the reactor vessel 18. All or part of the formwork 30 may provide structural support even after the concrete has set. However, all or part of the formwork 30 may not provide any structural support and may either remain in place after the concrete has set or may be removed.

Constructing a nuclear reactor module 10 on-site from a part-built nuclear reactor module 100 manufactured and tested in a factory provides a number of advantages. It is important that the interior of the containment structure 12 is kept clean and this is easier to ensure if the part-built module 100 is assembled in a factory. It is also easier and more efficient to test the nuclear reactor equipment in a factory environment. Furthermore, constructing the part-built module 100 in a factory is less expensive and more repeatable when compared to an on-site construction and also allows the use of specialist equipment.

Since the part-built module 100 contains formwork 30 that is arranged to be filed with concrete to form a concrete support structure 16 (as opposed to a concrete support structure itself) it is possible to transport the part-built module 100 by vehicle from the factory to the site. On site, the interior of the containment structure 12 is kept clean by filling the formwork 30 through the concrete supply piped 36 from the outside of the containment structure 12. This also allows the sensitive nuclear reactor equipment to be fitted and tested before the concrete support structure 16 is constructed.

In order to prevent the formation of cavities within the concrete poured into the formwork 30 it may be necessary to design additional features into the formwork. As shown in FIG. 3, some or all of the voids 34 may comprise a main structural void 40 with a smaller expansion void 42 disposed above it. In this arrangement a structural support plate 44, which is substantially horizontal, is disposed between the structural void 40 and the expansion void 42 and has a plurality of holes therein. These holes allow for the flow of concrete between the structural and expansion voids 40, 42. A concrete supply pipe 36 extends into the bottom of the structural void 40 and a vent pipe extends from the expansion void 36. On site concrete is poured into the void 34 of the formwork 30 through the concrete supply pipe 36. The void 34 is filled with concrete above the level of the structural support plate 44 and therefore partially fills the expansion void 42. Any dust or exhaust gases are vented through the vent pipe 38. The structural support plate 44 is arranged to support a load which it transmits to the structural concrete contained within the structural void 40. Any cavities and gas bubbles are contained within the non-structural concrete contained within the expansion void 42. The expansion void 42 may also contain tools which can vibrate the concrete during pouring and may be used to control the humidity within the void 34.

The part-built nuclear reactor module may include any nuclear plant sub-system up to and including the entire plant. The nuclear equipment supported by the formwork may be any component of a nuclear plant or installation requiring support from a concrete structure.

The invention claimed is:

1. A method of constructing a nuclear reactor module, the method comprising:
   providing a first formwork defining a chamber in which is mounted a nuclear reactor comprising a nuclear reactor pressure vessel configured to contain nuclear fuel when in use;
   providing a second formwork defining a containment structure configured to contain an internal pressure generated by an escape of coolant from a reactor coolant circuit, the first formwork being housed within the second formwork;
   filling one or more voids within the first formwork with concrete through at least one concrete supply pipe that extends from outside of the second formwork, through the second formwork, and through a wall of the first formwork so as to open into the one or more voids of the first formwork;
   forming the containment structure by filling one or more voids within the second formwork with concrete; and
   venting the one or more voids within the first formwork through one or more vent pipes, thereby forming a concrete support structure for the nuclear reactor,
   wherein the filling of the one or more voids within the second formwork occurs after the filling of the one or more voids within the first formwork.

2. The method of constructing a nuclear reactor module according to claim 1,
   further comprising removing at least one removable support that is configured to support at least some of the nuclear reactor during transportation.

3. The method of constructing a nuclear reactor module according to claim 1, further comprising removing at least one removable brace that is configured to support at least some of the first formwork during transportation.

4. The method of constructing a nuclear reactor module according to claim 1, further comprising:
   detaching the at least one concrete supply pipe after the first formwork has been filled with concrete, and
   removing the at least one concrete supply pipe from the containment second formwork.

5. The method of constructing a nuclear reactor module according to claim 1,
   wherein the first formwork comprises at least one arrangement comprising: (i) a structural void, (ii) an expansion void disposed above the structural void, and (iii) a structural support plate disposed between the structural void and the expansion void and having at least one hole therein, and
   wherein the method further comprises filling the structural void with concrete to a level above the structural support plate such that the structural void is filled with structural concrete that can support a load applied to the structural support plate.

* * * * *